United States Patent
Kuo et al.

(10) Patent No.: US 12,536,273 B2
(45) Date of Patent: Jan. 27, 2026

(54) ELECTRONIC SYSTEM AND SECURITY AUTHORITY DELEGATION METHOD THEREOF

(71) Applicant: ASPEED Technology Inc., Hsinchu (TW)

(72) Inventors: Chin-Ting Kuo, Hsinchu (TW); Chia-Wei Wang, Hsinchu (TW); Hung Liu, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 379 days.

(21) Appl. No.: 18/081,710

(22) Filed: Dec. 15, 2022

(65) Prior Publication Data

US 2024/0134968 A1    Apr. 25, 2024
US 2024/0232334 A9    Jul. 11, 2024

(30) Foreign Application Priority Data

Oct. 24, 2022    (TW) .................................. 111140184

(51) Int. Cl.
     *G06F 21/54*      (2013.01)
     *G06F 21/57*      (2013.01)
     *G06F 21/60*      (2013.01)

(52) U.S. Cl.
     CPC .............. *G06F 21/54* (2013.01); *G06F 21/57* (2013.01); *G06F 21/602* (2013.01)

(58) Field of Classification Search
     CPC ......... G06F 21/54; G06F 21/57; G06F 21/602
     See application file for complete search history.

(56) References Cited

U.S. PATENT DOCUMENTS 11,238,159 B1 *    2/2022    Clark-Lindh ......... G06F 21/572
2005/0265546 A1 *    12/2005    Suzuki .................. H04L 9/0662
     380/44
(Continued)

FOREIGN PATENT DOCUMENTS

CN      102012979      4/2011
CN      102436566      5/2012
(Continued)

OTHER PUBLICATIONS

"Office Action of Taiwan Counterpart Application", issued on Jun. 11, 2024, p. 1-p. 23.

*Primary Examiner* — Farid Homayounmehr
*Assistant Examiner* — Judy Bazna
(74) *Attorney, Agent, or Firm* — JCIPRNET

(57) ABSTRACT

An electronic system and a security authority delegation method thereof are provided. The electronic system includes a first host device, a second host device, a first security device, and a second security device. The first security device is connected to the first host device. The second security device is connected to the second host device and the first security device. The first security device performs an attestation process on the second security device. If the second security device passes the attestation process, the first security device enables the second security device to verify executable images of the second host device. If the second security device does not pass the attestation process, the first security device disables a function of the second security device, and the function includes verifying the executable image of the second host device.

20 Claims, 13 Drawing Sheets

(56) References Cited

U.S. PATENT DOCUMENTS

| | | | | |
|---|---|---|---|---|
| 2017/0109186 A1* | 4/2017 | Figueroa | .................... | G06F 8/61 |
| 2018/0330095 A1* | 11/2018 | Packer Ali | ............ | H04L 9/3247 |
| 2020/0314647 A1* | 10/2020 | Wang | .................. | H04L 63/0823 |
| 2022/0165404 A1* | 5/2022 | Vivek | .................... | H04L 9/3263 |
| 2022/0292203 A1 | 9/2022 | Severns-Williams et al. | | |
| 2023/0161881 A1* | 5/2023 | Perez | .................... | G06F 21/572 |
| | | | | 713/2 |

FOREIGN PATENT DOCUMENTS

| | | |
|---|---|---|
| CN | 103620613 | 3/2014 |
| CN | 106778286 | 5/2017 |
| CN | 111797440 | 10/2020 |
| CN | 113868004 | 12/2021 |
| TW | 202103037 | 1/2021 |

\* cited by examiner

ELECTRONIC SYSTEM AND SECURITY AUTHORITY DELEGATION METHOD THEREOF

CROSS-REFERENCE TO RELATED APPLICATION

This application claims the priority benefit of Taiwan application serial no. 111140184, filed on Oct. 24, 2022. The entirety of the above-mentioned patent application is hereby incorporated by reference herein and made a part of this specification.

BACKGROUND

Technical Field

The disclosure relates to a platform security protection method, and in particular relates to an electronic system and a security authority delegation method thereof.

Description of Related Art

With the rapid growth of firmware security requirements and rapid changes in application scenarios, the existing secured SoCs or other secure SoCs with platform firmware resiliency (PFR) mechanisms will gradually be unable to meet the actual requirements. It is foreseeable that the resources or capabilities provided by these existing secured SoCs may become insufficient. For example, if the number of SPI hosts or I2C hosts on the motherboard increases, the required number of SPI channel monitors or I2C channel filter controllers in the security SoC also increases. However, it is quite impractical to redesign or manufacture a completely new secured SoC for various requirements.

Furthermore, the boot performance of the current PFR framework is an issue that needs to be explored. After the system is powered on, during the PFR T-1 stage, the secure SoC needs to read all of the executable images from all of the static memories. Before entering the PFR T0 stage, the secured SoC needs to perform an integrity check or image verification on all of the executable images. However, when the data volume of the executable images is huge, the secured SoC needs to expend more time to complete the integrity check or image verification of the executable images. As the number of executable images increases, the time consuming phenomenon becomes more and more serious. The PFR T-1 stage here refers to the period from system power-on to the time before the host device reset is released, and the PFR T0 stage refers to the stage after the host device reset is released.

SUMMARY

In view of this, embodiments of the disclosure provide an electronic system and a security authority delegation method thereof, which may solve the aforementioned technical problems.

An embodiment of the disclosure provides an electronic system including a first host device, a second host device, a first security device, and a second security device. The first security device is connected to the first host device. The second security device is connected to the second host device and the first security device. The first security device performs an attestation process on the second security device. If the second security device passes the attestation process, the first security device enables the second security device to verify an executable image of the second host device and monitor subsequent platform channel transmissions. If the second security device does not pass the attestation process, the first security device disables a function of the second security device, and the function includes verifying the executable image of the second host device.

In some embodiments of the disclosure, the electronic system further includes a first storage device and a second storage device. The first storage device is connected to the first security device and stores the executable images of the first host device. The first security device verifies the executable images of the first host device. The second storage device is connected to the second security device and stores the executable images of the second host device. The second security device verifies the executable images of the second host device.

In some embodiments of the disclosure, the attestation process includes the following operation. The first security device or the second security device generates a first random number. The first security device generates a first key according to a first original key and the first random number, and the second security device generates a second key according to a second original key and the first random number. The second security device encrypts verification data using the second key to generate encrypted verification data, and transmits the encrypted verification data to the first security device. The first security device decrypts the encrypted verification data using the first key to obtain decrypted verification data. The first security device determines whether the second security device passes the attestation process according to the decrypted verification data. The keys described herein may be symmetric or asymmetric keys.

In some embodiments of the disclosure, the attestation process includes the following operation. If the decrypted verification data is invalid, the first security device determines that the second security device does not pass the attestation process. If the decrypted verification data is valid, the first security device determines whether device status information of the second security device is valid. If the device status information of the second security device is invalid, the first security device determines that the second security device does not pass the attestation process. If the device status information of the second security device is valid, the first security device determines that the second security device passes the attestation process.

In some embodiments of the disclosure, the attestation process includes the following operation. The second security device encrypts device status information of the second security device using the second key to generate encrypted device status information. The second security device transmits the encrypted device status information to the first security device. The first security device decrypts the encrypted device status information using the first key to obtain the device status information of the second security device.

In some embodiments of the disclosure, the verification data includes a second random number generated by the first security device, the first security device transmits the second random number to the second security device, and the first security device determines whether the decrypted verification data is the same as the second random number generated originally, in order to determine whether the second security device passes the attestation process.

In some embodiments of the disclosure, the verification data includes credential data of the second security device. The first security device determines whether the credential data of the second security device is valid using a public key, to determine whether the second security device passes the attestation process.

In some embodiments of the disclosure, the public key is recorded in the root credential data of the first security device, and the first security device obtains the public key from the root credential data after determining that the root credential data is valid.

In some embodiments of the disclosure, the public key is recorded in a key list of the first security device. The first security device obtains a list public key of the key list after determining that the root credential data is valid, and uses the list public key to verify and obtain the key list. The key list also includes an image verification key used to verify the executable image of the host devices.

In some embodiments of the disclosure, the attestation process further includes the following operation. The first security device determines whether a usage count of the first key is greater than a preset value. If the usage count of the first key is greater than the preset value, the first security device regenerates the first random number.

In some embodiments of the disclosure, the first security device regularly or irregularly performs the attestation process on the second security device.

In some embodiments of the disclosure, after the electronic system is powered on, the first security device performs an attestation process on the second security device.

In some embodiments of the disclosure, the electronic system further includes a third host device and a third security device. The third security device is connected to the third host device and the second security device. If the second security device passes the attestation process, the second security device performs the attestation process on the third security device. If the third security device passes the attestation process, the second security device enables the third security device to verify executable images of the third host device and monitor subsequent platform channel transmissions.

From another point of view, an embodiment of the disclosure provides a security authority delegation method, which is suitable for an electronic system including a first host device, a second host device, a first security device, and a second security device, and the method includes the following operation. An attestation process is performed on the second security device by the first security device. The first security device is connected to the first host device, and the second security device is connected to the second host device and the first security device. If the second security device passes the attestation process, the second security device is enabled by the first security device to verify the executable images of the second host device and monitor subsequent platform channel transmissions. If the second security device does not pass the attestation process, a function of the second security device is disabled by the first security device, and the function includes verifying the executable image of the second host device.

Based on the above, in the embodiment of the disclosure, multiple security devices may be connected to each other to form a device topology, and these security devices are each connected to the corresponding host devices, thereby solving the problem of insufficient resources of a single secured SoC in the existing trusted platform. In addition, multiple security devices may simultaneously verify executable images of multiple host devices, and the electronic system of the embodiment of the disclosure may reduce the time for verifying the executable images, thereby effectively improving system performance.

In order to make the above-mentioned features and advantages of the disclosure comprehensible, embodiments accompanied with drawings are described in detail below.

DETAILED DESCRIPTION OF DISCLOSED EMBODIMENTS

Figure 1:
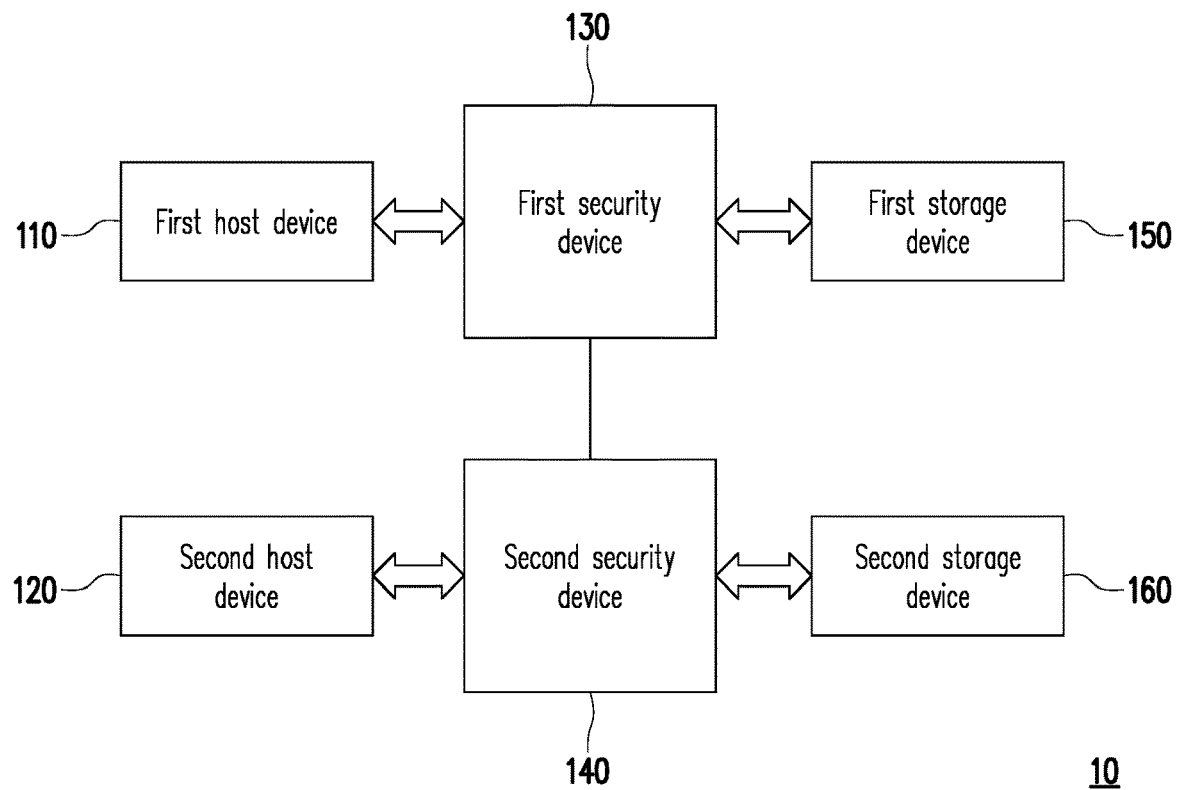
FIG. 1 is a block diagram of an electronic system according to an embodiment of the disclosure.

FIG. 1 is a block diagram of an electronic system according to an embodiment of the disclosure. Referring to FIG. 1, the electronic system 10 of this embodiment includes a first host device 110, a second host device 120, a first security device 130, a second security device 140, a first storage device 150, and a second storage device 160. In some embodiments, the electronic system 10 may be implemented, for example, as a personal computer, a server, or other electronic devices that require a trusted platform module unit.

The first host device 110 and the second host device 120 are, for example, a central processing unit (CPU), a microcontroller (MCU), or a board management controller (BMC), but not limited thereto. In some embodiments, the first host device 110 and the second host device 120 may be implemented as serial peripheral interface (SPI) host devices. In other embodiments, the first host device 110 and the second host device 120 may be implemented as inter-integrated circuit (I2C) host devices. That is, the first host device 110 may be connected to the first security device 130 via the SPI interface. Alternatively, the first host device 110 may be connected to the first security device 130 via an I2C interface.

The first storage device 150 and the second storage device 160 are, for example, a non-volatile memory (NVM) such as a flash memory or any type of read-only memory (ROM), but not limited thereto. The first storage device 150 and the second storage device 160 are used for storing executable images of the electronic system 10. These executable images are stored, for example, in the first storage device 150 and the second storage device 160 in the form of binary images. These executable images may also be referred to as firmware images. The first storage device 150 is used to store the executable images of the first host device 110, and the second storage device 160 is used to store the executable images of the second host device 120. The first storage device 150 is connected to the first security device 130, and the second storage device 160 is connected to the second security device 140.

The first security device 130 and the second security device 140 are, for example, a programmable general-purpose or special-purpose microprocessor (MPU), a microcontroller (MCU), an application specific integrated circuit (ASIC), a programmable logic device (PLD), or other similar devices, or a combination of these devices, but not limited thereto. In some embodiments, the first security device 130 and the second security device 140 may be respectively implemented as secured SoCs installed on the motherboard. In some embodiments, the first security device 130 and the second security device 140 are, for example, platform firmware resiliency modules.

In some embodiments, the first security device 130 and the second security device 140 may be connected to the first host device 110 and the second host device 120 through an SPI bus. Similarly, the first security device 130 and the second security device 140 may be connected to the first storage device 150 and the second storage device 160 through an SPI bus. In addition, the first security device 130 is connected to the second security device 140. For example, the first security device 130 and the second security device 140 may be connected through an I2C bus, but not limited thereto. In addition, in some embodiments, the first security device 130 and the second security device 140 may also be respectively connected to other peripheral devices through a bus.

After the electronic system 10 is powered on, the first security device 130 and the second security device 140 respectively verify the integrity and validity of the executable images to be executed on the platform. In addition, the first security device 130 may monitor the data flow and transfer data between the first host device 110, the first storage device 150 and other peripheral devices, while the second security device 140 may monitor the data flow and transfer data between the second host device 120, the second storage device 160 and other peripheral devices. Accordingly, the first security device 130 and the second security device 140 may protect the electronic system 10 from being attacked by malicious software.

However, it should be noted that, in order to clearly illustrate the operation principle of the embodiment of the disclosure, the electronic system 10 shown in FIG. 1 is described by taking a security device monitoring a host device and a storage device as an example. The number of host devices and the number of storage devices monitored by a security device is not limited thereto.

Figure 2:
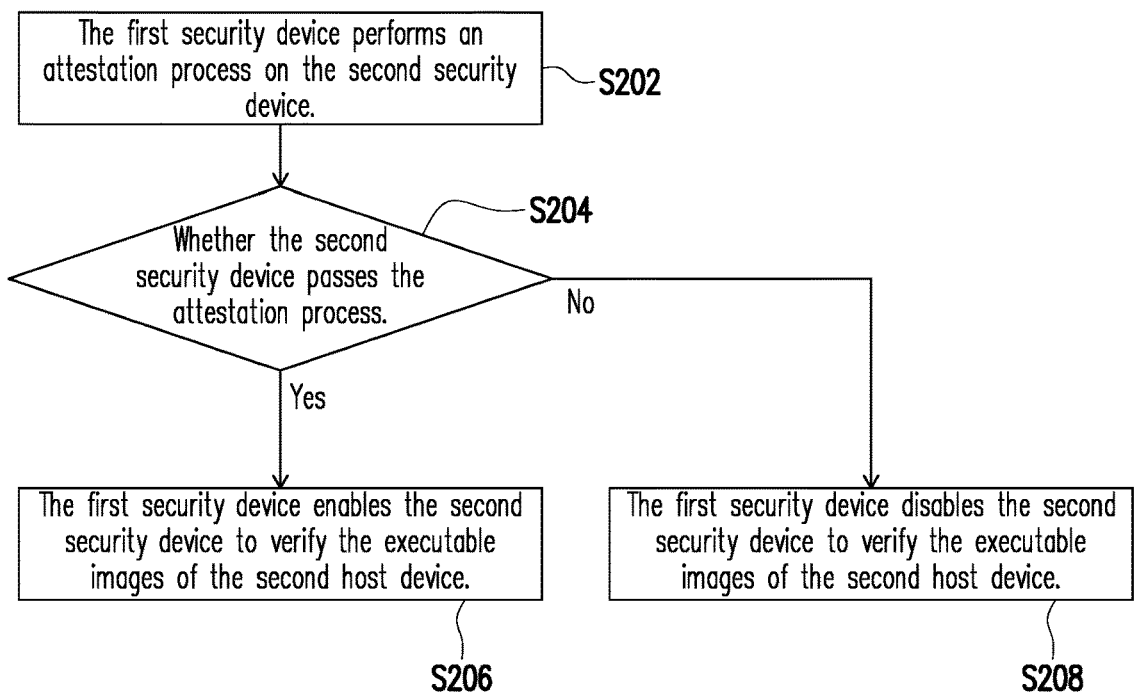
FIG. 2 is a flowchart of a security authority delegation method according to an embodiment of the disclosure.

FIG. 2 is a flowchart of a security authority delegation method according to an embodiment of the disclosure. Referring to FIG. 1 and FIG. 2 at the same time, the method of this embodiment is suitable for the electronic system 10. The following describes the detailed steps of the security authority delegation method of this embodiment in conjunction with various elements of the electronic system 10.

In step S202, the first security device 130 performs an attestation process on the second security device 140. In some embodiments, the first security device 130 may serve as a security control center of the platform or the entire electronic system 10, that is, as a root of trust (RoT). The first security device 130 may perform an attestation process on the second security device 140 to determine whether to delegate the authority for maintaining firmware security to the second security device 140. In other words, the first security device 130 may be a master security device, and the second security device 140 may be a slave security device controlled by the master security device. In the embodiment of the disclosure, the master security device performs an attestation process on the slave security device to determine whether to enable or disable the slave security device from performing the platform firmware resiliency operation.

In step S204, the first security device 130 determines whether the second security device 140 passes the attestation process. In some embodiments, the first security device 130 may use one or more cryptographic mechanisms to perform an attestation process on the second security device 140 to determine whether the second security device 140 passes the attestation process. The aforementioned cryptographic mechanism may include symmetric encryption algorithm, asymmetric encryption algorithm, hash algorithm or digital signature algorithm, etc., but not limited thereto. In addition, in some embodiments, the first security device 130 may determine whether the second security device 140 passes the attestation process according to the device status information provided by the second security device 140. In other words, the first security device 130 may determine whether the second security device 140 is trustworthy through the attestation process.

Figure 3:
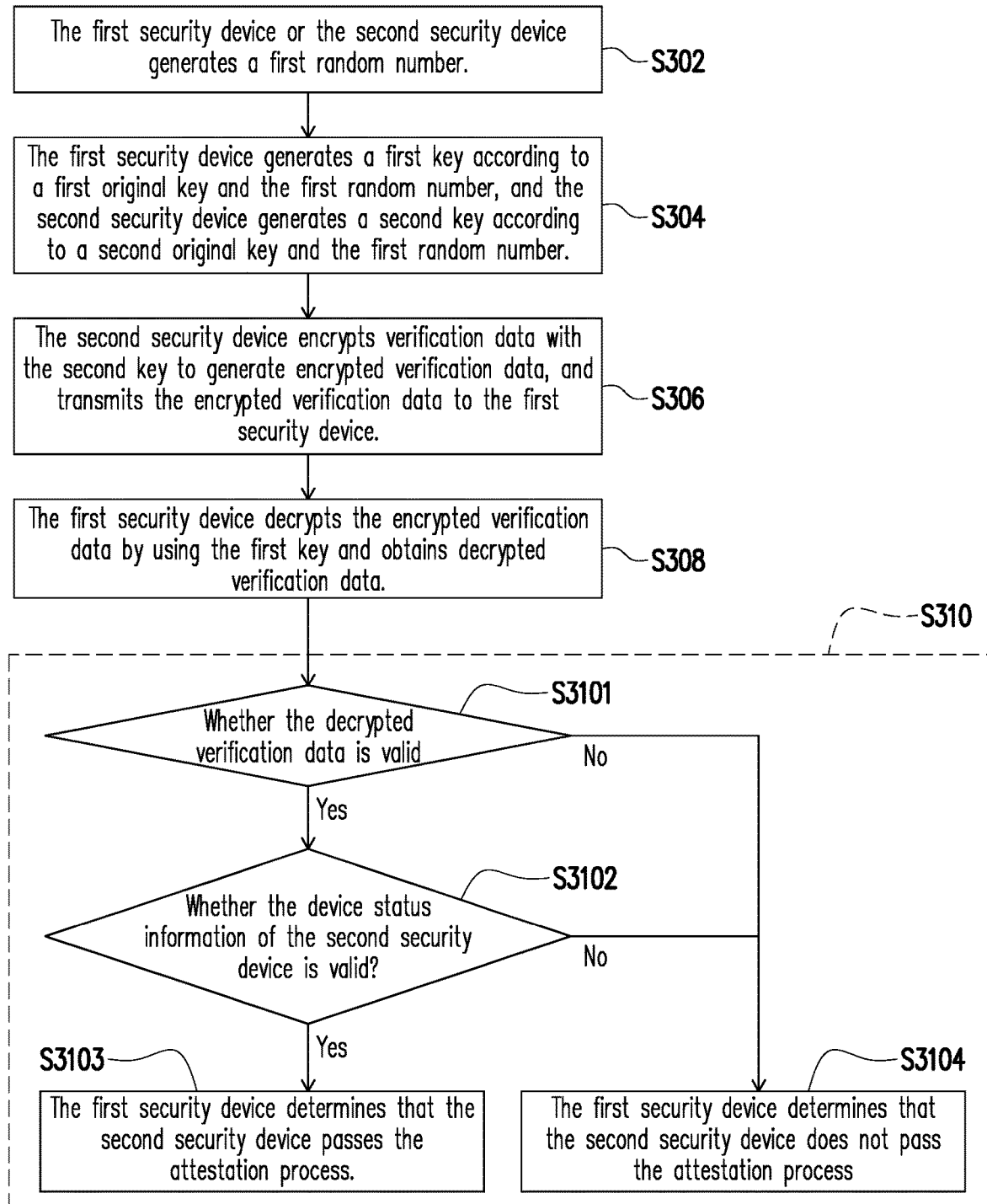
FIG. 3 is a flowchart of an attestation process according to an embodiment of the disclosure.

In detail, refer to FIG. 3, which is a flowchart of an attestation process according to an embodiment of the disclosure. In step S302, the first security device 130 or the second security device 140 generates a first random number. When the first security device 130 generates the first random number, the first security device 130 may transmit the first random number to the second security device 140 through the bus. When the second security device 140 generates the first random number, the second security device 140 may transmit the first random number to the first security device 130 through the bus. The first random parameter (number) may be a pseudo random number or a true random number, and the disclosure is not limited thereto.

In step S304, the first security device 130 generates a first key according to the first original key and the first random number, and the second security device 140 generates a second key according to the second original key and the first random number. The first key and the second key may be asymmetric keys or symmetric keys, and the disclosure is not limited thereto. In detail, the first original key may be embedded in the one-time programmable memory of the first security device 130, the first original key is immutable and only allowed to be accessed by the crypto engine circuit inside the first security device 130. Similarly, the second original key may be embedded in the one-time programmable memory of the second security device 140, the second original key is immutable and only allowed to be accessed by the crypto engine circuit inside the second security device 140. The aforementioned one-time programmable memory may include an eFuse, etc., and the disclosure is not limited thereto. Therefore, the first security device 130 may perform an attestation process on the second security device 140 by determining whether the second original key in the second security device 140 is the same as the first original key therein. If the second original key is different from the first original key, the first security device 130 may determine that the second security device 140 has not passed the attestation process, that is, it is an untrusted device.

Therefore, in some embodiments, in order to avoid the exposure of the first original key and the second original key, based on an asymmetric encryption algorithm or a symmetric encryption algorithm, the crypto engine circuit of the first security device 130 and the crypto engine circuit of the second security device 140 may respectively generate the first key and the second key according to the first random number and the respective first original key and the second original key. The second security device 140 uses the second key to encrypt the data, and correspondingly, the first security device 130 uses the first key to decrypt the data.

In step S306, the second security device 140 encrypts the verification data with the second key to generate the encrypted verification data, and transmits the encrypted verification data to the first security device 130. In some embodiments, the verification data may include random numbers generated by the first security device 130. Alternatively, in other embodiments, the verification data may include credential data of the second security device 140. In step S308, the first security device 130 decrypts the encrypted verification data by using the first key and obtains the decrypted verification data. Next, in step S310, the first security device 130 determines whether the second security device 140 passes the attestation process according to the decrypted verification data.

Step S310 may be implemented as step S3101 to step S3104. In step S3101, the first security device 130 determines whether the decrypted verification data is valid. In some embodiments, the first security device 130 may determine whether the decrypted verification data is the same as the random number generated by the first security device 130 in order to determine whether the decrypted verification data is valid. In some embodiments, the first security device 130 may determine whether the credential data in the decrypted verification data passes the verification, so as to determine whether the decrypted verification data is valid. In some embodiments, the first security device 130 may determine whether the credential content in the decrypted verification data meets expectations, so as to determine whether the decrypted verification data is valid. In some embodiments, if the decrypted verification data is valid, it means that the second original key in the second security device 140 is the same as the first original key in the first security device 130. Alternatively, in some embodiments, if the decrypted verification data is valid, it means that the credential data provided by the second security device 140 is valid and the credential content is as expected.

If the decrypted verification data is invalid (determined as No in step S3101), in step S3104, the first security device 130 determines that the second security device 140 does not pass the attestation process. On the other hand, if the decrypted verification data is valid (determined as Yes in step S3101), in step S3102, the first security device 130 further determines whether the device status information of the second security device 140 is valid. The device status information of the second security device 140 may include values recorded in the one-time programmable memory, current temperature, voltage/current value, CPU frequency, executable images measurement, or memory usage status. There are hardware elements in the second security device 140 which are directly collected by the dedicated HW design in security device 140. By determining whether the device status information of the second security device 140 is valid, the first security device 130 may determine whether the second security device 140 is operating in an expected status. If the device status information of the second security device 140 is valid, it means that the second security device 140 is operating in the expected status.

For example, the first security device 130 may determine whether the second security device 140 has the ability to connect to an external network according to the value recorded in the one-time programmable memory provided by the second security device 140, so as to determine whether the second security device 140 is trustworthy. When the value recorded in the one-time programmable memory provided by the second security device 140 indicates that the second security device 140 does not have the ability to connect to an external network, the first security device 130 determines that the device status information of the second security device is valid. On the contrary, when the value recorded in the one-time programmable memory provided by the second security device 140 indicates that the second security device 140 has the ability to connect to an external network, the first security device 130 determines that the device status information of the second security device 140 is invalid.

In addition, in some embodiments, the second security device 140 may encrypt the device status information of the second security device 140 using the second key to generate encrypted device status information. Next, the second security device 140 transmits the encrypted device status information to the first security device 130. The first security device 130 decrypts the encrypted device status information using the first key to obtain the device status information of the second security device 140.

If the device status information of the second security device 140 is valid, in step S3103, the first security device 130 determines that the second security device 140 passes the attestation process. If the device status information of the second security device is invalid, in step S3104, the first security device 130 determines that the second security device 140 does not pass the attestation process. That is, when the decrypted verification data is valid and the device status information of the second security device 140 is valid, the first security device 130 determines that the second security device 140 passes the attestation process. When the decrypted verification data is invalid or the device status information of the second security device 140 is invalid, the first security device 130 determines that the second security device 140 does not pass the attestation process.

Next, returning to FIG. 2, if the second security device 140 passes the attestation process (determined as Yes in step S204), the first security device 130 enables the second security device 140 to verify the executable images of the second host device 120. In addition, in some embodiments, if the second security device 140 passes the attestation process (determined as Yes in step S204), the first security device 130 may also enable the second security device 140 to perform other platform firmware resiliency operations. Further, in some embodiments, after the electronic system 10 is powered on, when both the second host device 120 and the second security device 140 are still in a reset status, the first security device 130 performs an attestation process on the second security device 140. More precisely, at this time, the second security device 140 has only a minimal function, such that the second security device 140 performs attestation interaction with the first security device 130. If the second security device 140 passes the attestation process, the first security device 130 may use the control signal to release the second security device 140 from the reset status, that is, the second security device 140 is switched to operate in the enabled status, so that the second security device 140 begins to perform platform firmware resiliency operations. Then, after the second security device 140 is switched to the enabled status, the second security device 140 verifies the integrity and validity of the executable images in the second storage device 160. In addition, the second security device 140 reads the executable image from the second storage device 160 when the second host device 120 is in a reset status, and may use a hash algorithm and a digital signature to verify the integrity and validity of the executable images of the second host device 120.

In some embodiments, if the verification of the executable image in the second storage device 160 is successful, the second security device 140 releases the second host device 120 from the reset status, that is, the second host device 120 is switched to the enabled status, so that the second host device 120 may read and execute the executable images in the second storage device 160. Otherwise, if the verification of any executable image in the second storage device 160 fails, the second security device 140 controls the second host device 120 to be in the reset status and terminate the execution of the executable images in the second storage device 160. In addition, the second security device 140 may notify the system administrator to process the executable image that fails the verification.

On the other hand, if the second security device 140 does not pass the attestation process (determined as No in step S204), the first security device 130 disables a function of the second security device 140, and the disabled function includes verifying the executable image of the second host device 120. In some implementations, if the second security device 140 does not pass the attestation process (determined as No in step S204), the first security device 130 may also disable all functions of the second security device 140, that is, such that the second security device 140 will be in reset status. Further, if the second security device 140 does not pass the attestation process, the first security device 130 controls the second security device 140 to be in the reset status through the control signal, that is, the authority to maintain firmware security is not delegated to the second security device 140, also, the capability of verifying the executable images in the second storage device 160 is disabled on the security device 140.

It may be seen from this that if the second security device 140 passes the attestation process, since the first security device 130 and the second security device 140 may perform the verification of the executable images synchronously, the time that the electronic system 10 operates in the PFR T-1 stage may be reduced. In addition, through the disposition of the second security device 140, the problem of insufficient resources of the existing secured SoCs may be effectively solved. Therefore, even if the number of host devices on the motherboard increases, by adding one or more additional slave security devices connected to the master security device, there is no need to redesign a new secured SoC. That is to say, the embodiments of the disclosure provide a more flexible and practical approach.

Figure 4:
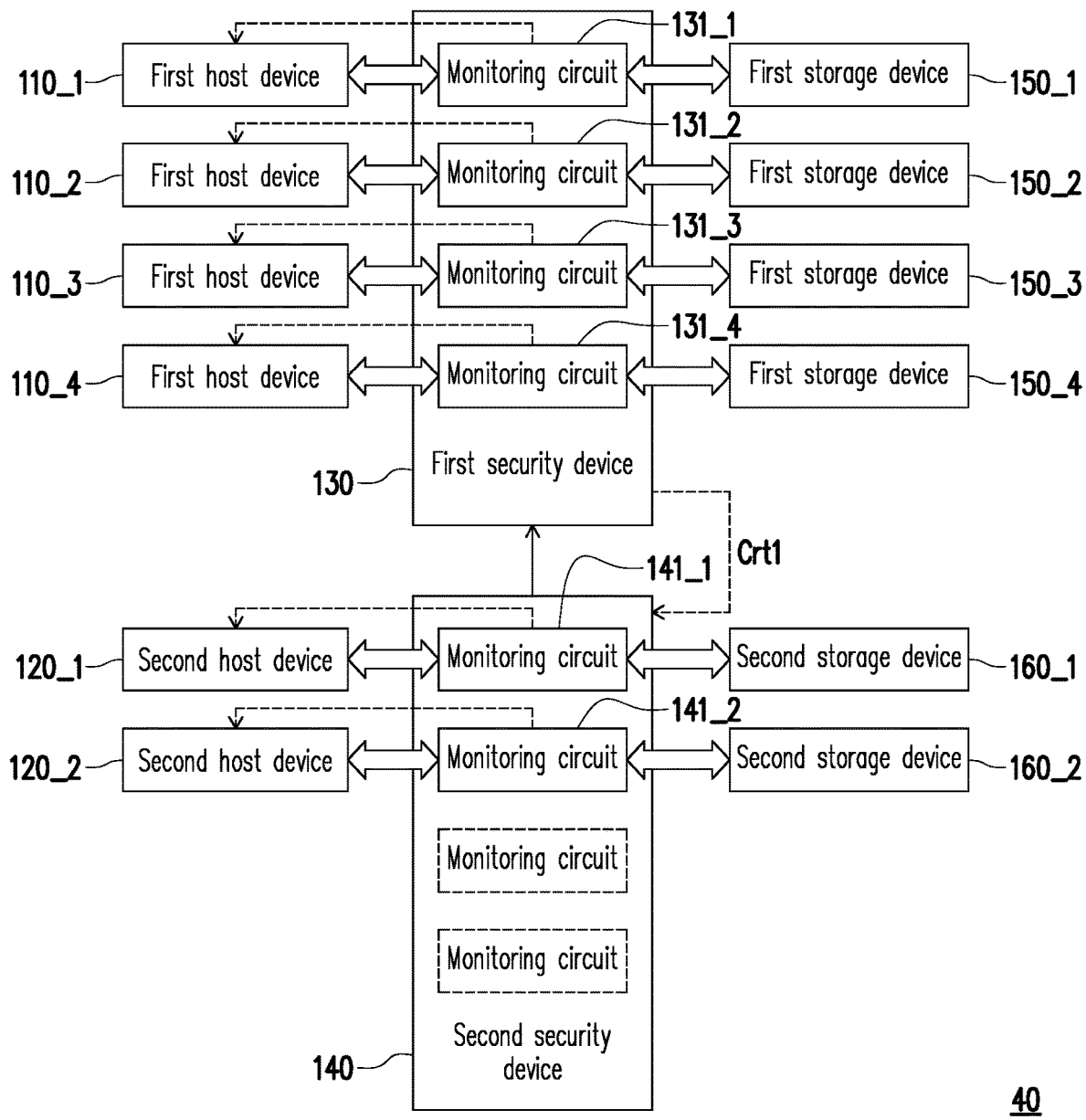
FIG. 4 is a block diagram of an electronic system according to an embodiment of the disclosure.

FIG. 4 is a block diagram of an electronic system according to an embodiment of the disclosure. Referring to FIG. 4, it is assumed that the electronic system 40 includes six host devices. Since the first security device 130 only includes four monitoring circuits 131_1 to 131_4, it cannot meet the requirement of six host devices. Nevertheless, in this embodiment, the electronic system 40 may include the first security device 130 and the second security device 140 which are interconnected with each other. After the electronic system 40 is powered on, the first security device 130, which serves as the master security device, may perform an attestation process on the second security device 140, which serves as the slave security device. When the second security device 140 passes the attestation process, the first security device 130 may release the second security device 140 from the reset status through the control signal Ctrl, and delegate the authority to the second security device 140 which will verify the executable image.

In detail, as shown in FIG. 4, the electronic system 40 includes four first host devices 110_1 to 110_4 connected to the first security device 130, and two second host devices 120_1 to 120_2 connected to the second security device 140. The four monitoring circuits 131_1 to 131_4 of the first security device 130 are respectively used to verify the integrity and validity of the executable images in the first storage devices 150_1 to 150_4. When the second security device 140 passes the attestation process, the two monitoring circuits 141_1 to 141_2 of the second security device 140 are respectively used to verify the integrity and validity of the executable images in the second storage devices 160_1 to 160_2. It may be seen from this that the disposition of the second security device 140 may solve the technical problem that the resources of the first security device 130 cannot cope with a large number of host devices. The monitoring circuits 131_1 to 131_4 and 141_1 to 141_2 may be, for example, SPI channel monitors or I2C channel filters. In addition, in some embodiments, the second security device 140 may also report the monitoring results of the monitoring circuits 141_1 to 141_2 to the first security device 130 via a dedicated transmission path.

Figure 5:
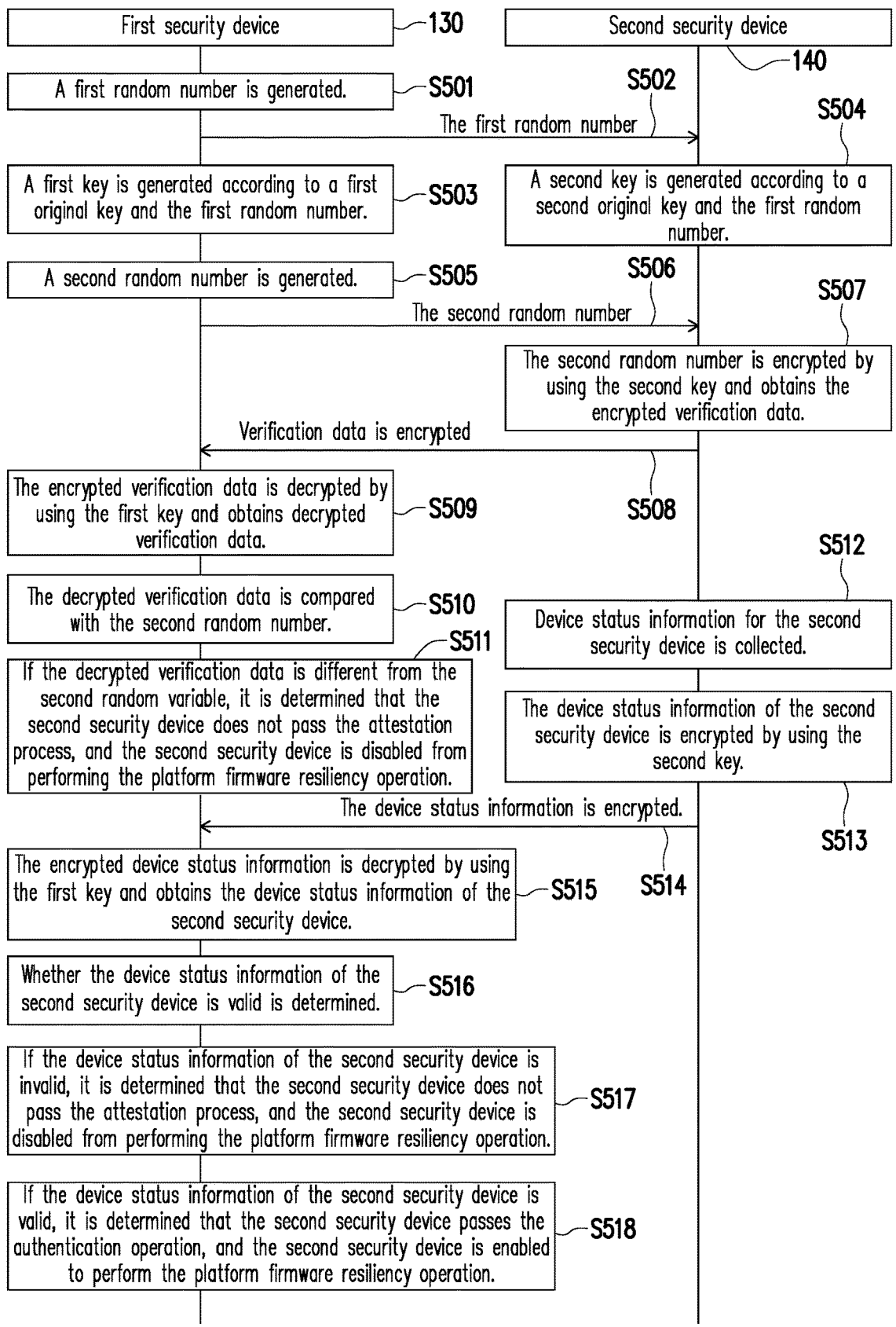
FIG. 5 is a flowchart of an attestation process according to an embodiment of the disclosure.

FIG. 5 is a flowchart of an attestation process according to an embodiment of the disclosure. Referring to FIG. 5, the method of this embodiment is suitable for the aforementioned electronic system 10 or 40. It should be noted that in FIG. 5, the verification data including a random number generated by the first security device 130 and a symmetric key being applied are taken as implemented example for illustration.

In step S501, the first security device 130 generates a first random number. In step S502, the first security device 130 transmits the first random number to the second security device 140. In step S503, the first security device 130 generates a first key by using the first random number and the first original key. In step S504, the second security device 140 generates a second key using the first random number and the second original key. The implementation details of step S501 to step S504 have been described in the embodiment shown in FIG. 3, and are not repeated herein.

In step S505, the first security device 130 generates a second random number. In step S506, the first security device 130 transmits the second random number to the second security device 140. In step S507, the second security device 140 encrypts the second random number by using the second key and obtains the encrypted verification data. In step S508, the second security device 140 transmits the encrypted verification data to the first security device 130. In step S509, the first security device 130 decrypts the encrypted verification data by using the first key and obtains the decrypted verification data. In step S510, the first security device 130 compares the decrypted verification data with the original second random number, and determines whether the decrypted verification data is the same as the original second random number. Specifically, in this embodiment, the verification data may include the second random number generated by the first security device 130. If the decrypted verification data is the same as the original second random number, the decrypted verification data is valid. If the decrypted verification data is different from the original second random number, the decrypted verification data is invalid.

Based on this, in step S511, if the decrypted verification data is different from the second random number, the first security device 130 determines that the second security device does not pass the attestation process, and disables the second security device from performing a function, the disabled function may include performing the platform firmware resiliency operation. On the other hand, if the decrypted verification data is the same as the original second random number, the first security device 130 continues to determine whether the device status information of the second security device 140 is as expected.

In step S512, the hardware in the second security device 140 directly collects the current device status information of the second security device 140. In step S513, the second security device 140 encrypts the device status information of the second security device 140 by using the second key. In step S514, the second security device 140 transmits the encrypted device status information to the first security device 130. In step S515, the first security device 130 decrypts the encrypted device status information by using the first key and obtains the device status information of the second security device 140. In step S516, the first security device 130 determines whether the device status information of the second security device 140 is valid. The implementation details of step S512 to step S516 have been described in the embodiment shown in FIG. 3, and are not repeated herein.

In step S517, if the device status information of the second security device is invalid, the first security device 130 determines that the second security device does not pass the attestation process, and disables a function of the second security device 140, which includes executing the platform firmware resiliency operation. In step S518, if the device status information of the second security device is valid, the first security device 130 determines that the second security device passes the attestation process, and enables the second security device to perform the platform firmware resiliency operation. The aforementioned platform firmware resiliency operation may include verifying the executable image and monitoring the transmission data between the host devices (e.g., the first host device 110 and the second host device 120) and other peripheral devices.

In addition, in some embodiments, the first security device 130 may repeatedly perform the attestation process on the second security device 140 regularly or irregularly. Alternatively, in some embodiments, the first security device 130 performs an attestation process on the second security device 140 in response to the electronic system 10 or 40 being powered on.

Figure 6A:
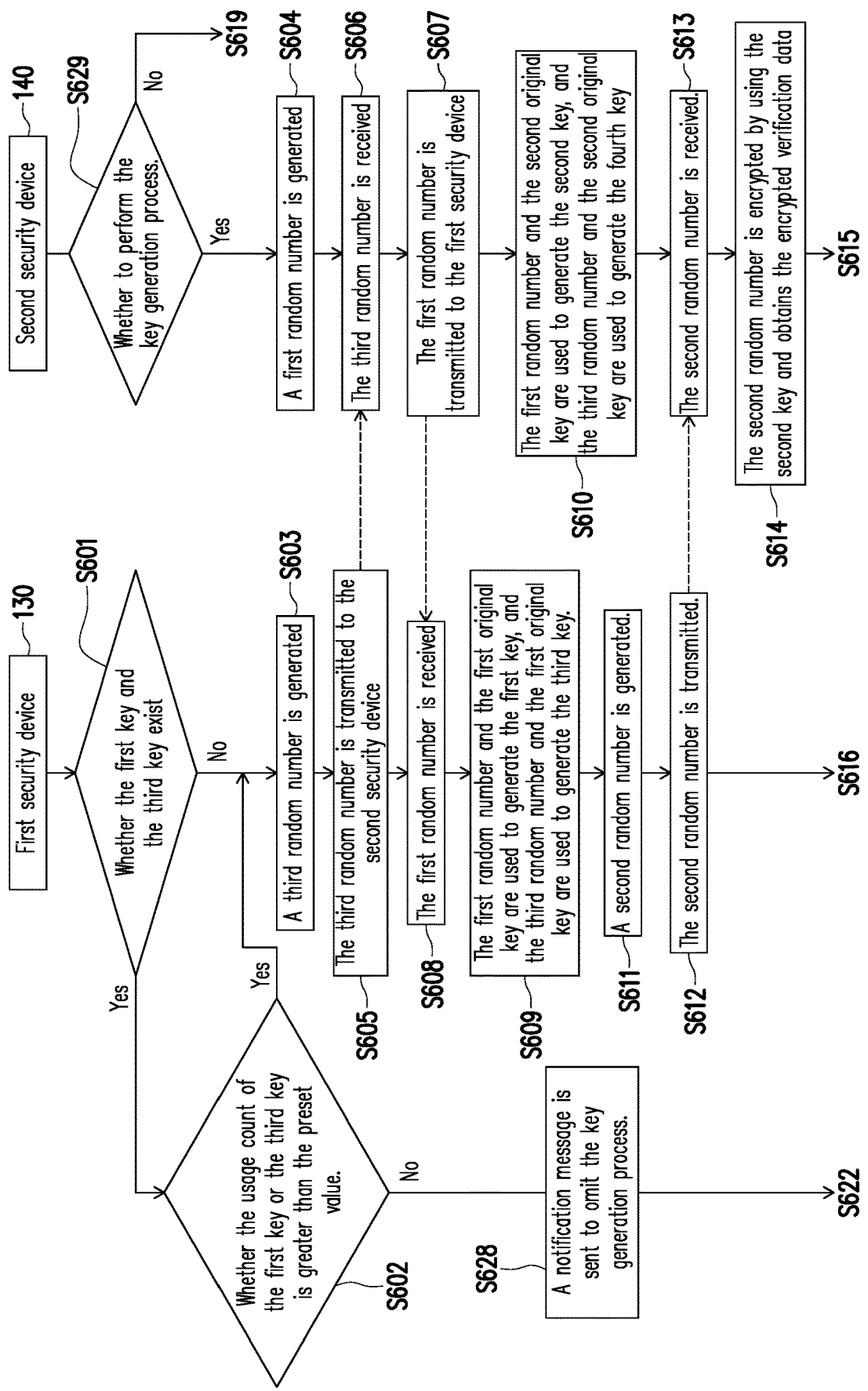
FIG. 6A and FIG. 6B are flowcharts of an attestation process according to an embodiment of the disclosure.
Figure 6B:
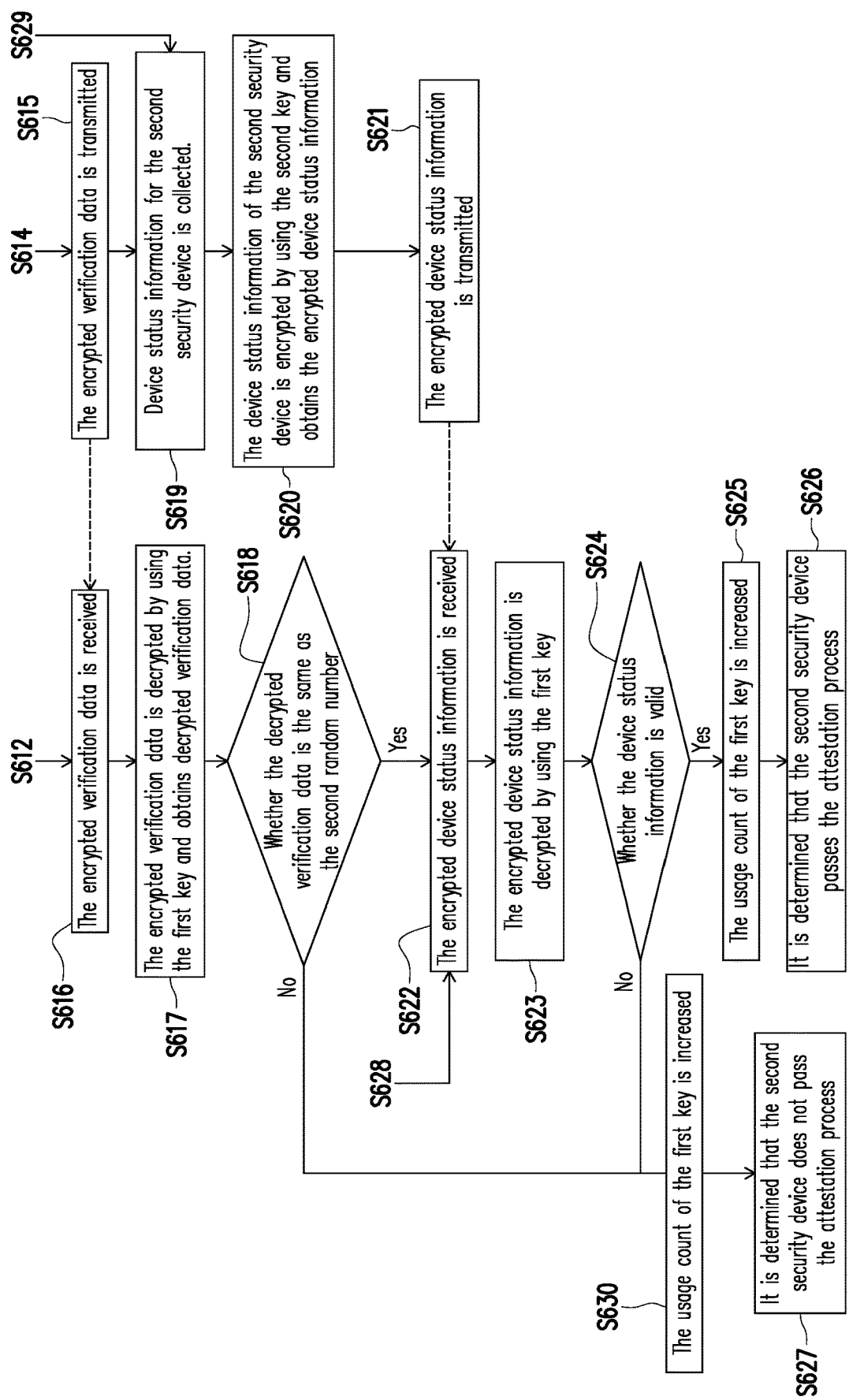

FIG. 6A and FIG. 6B are flowcharts of an attestation process according to an embodiment of the disclosure. Referring to FIG. 6A and FIG. 6B, the method of this embodiment is suitable for the aforementioned electronic system 10 or 40. In the example of FIG. 6A and FIG. 6B, the verification data including a random number generated by the first security device 130 and a symmetric key being applied are taken as implemented example for illustration.

In step S601, the first security device 130 determines whether the first key and the third key exist. In this embodiment, the first security device 130 uses the first key to decrypt the data, and uses the third key to encrypt the data. If the first key and the third key exist (determined as Yes in step S601), in step S602, the first security device 130 determines whether the usage count of the first key or the third key is greater than the preset value to determine whether the first key and the third key need to be updated in order to improve security.

If the usage count of the first key is greater than the preset value (determined as Yes in step S602) or the first key and the third key do not exist (determined as No in step S601), the key generation process is executed by the first security device 130 and the second security device 140. That is, when the first security device 130 has not generated the first key and the third key, or the first key or the third key have been used many times, the key generation process is executed by the first security device 130 and the second security device 140. Therefore, in step S603, the first security device 130 generates a third random number. In step S604, the second security device 140 generates a first random number. If the number of times the first key is used is not greater than the preset value (determined as No in step S602), the first security device 130 and the second security device 140 may omit the key generation process, and the first security device 130 continues to perform step S628. In step S628, the first security device 130 sends a notification message to notify the second security device 140 to omit the execution of the key generation process, and proceeds to step S622. Correspondingly, before step S604, in step S629, the second security device 140 determines whether to execute the key generation process. If the notification message sent by the first security device 130 is not received, the second security device 140 determines to execute the key generation process (determined as Yes in step S629), and proceeds to step S604. On the contrary, if the notification message sent by the first security device 130 is received, the second security device 140 will not execute the key generation process (determined as No in step S629), and proceeds to step S619.

In step S605, the first security device 130 transmits the third random number to the second security device 140. In step S606, the second security device 140 receives the third random number. In step S607, the second security device 140 transmits the first random number to the first security device 130. In step S608, the first security device 130 receives the first random number.

In step S609, the first security device 130 generates a first key by using the first random number and the first original key, and generates a third key by using the third random number and the first original key. In step S610, the second security device 140 generates a second key by using the first random number and the second original key, and generates a fourth key by using the third random number and the second original key. In this embodiment, the second security device 140 encrypts the data transmitted to the first security device 130 by using the second key, and the second security device 140 decrypts the data received from the first security device 130 by using the fourth key. That is, the first key used by the first security device 130 for decryption purpose is paired with the second key used by the second security device 140 for encryption purpose, and the third key used by the first security device 130 for encryption purpose is paired with the fourth key used by the second security device 140 for decryption purpose.

In step S611, the first security device 130 generates a second random number. In step S612, the first security device 130 transmits the second random number. In step S613, the second security device 140 receives the second random number. In step S614, the second security device 140 encrypts the second random number by using the second key and obtains the encrypted verification data. In step S615, the second security device 140 transmits the encrypted verification data. In step S616, the first security device 130 receives the encrypted verification data. In step S617, the first security device 130 decrypts the encrypted verification data by using the first key and obtains the decrypted verification data. In step S618, the first security device 130 determines whether the decrypted verification data is the same as the second random number, so as to determine whether the second security device 140 passes the attestation process.

On the other hand, in step S619, the second security device 140 collects the device status information of the second security device 140. In step S620, the second security device 140 encrypts the device status information of the second security device 140 by using the second key and obtains the encrypted device status information. In step S621, the second security device 140 transmits the encrypted device status information to the first security device 130.

If the determination in step S618 is "Yes", the process proceeds to step S622, and the first security device 130 receives the encrypted device status information. In step S623, the first security device 130 decrypts the encrypted device status information by the first key. In step S624, the first security device 130 determines whether the device status information is valid. If the determination in step S624 is "Yes", in step S625, the first security device 130 increases the usage count of the first key. In step S626, the first security device 130 determines that the second security device 140 passes the attestation process. If the determination in step S618 or step S624 is "No", in step S630, the first security device 130 increases the usage count of the first key. Next, in step S627, the first security device 130 determines that the second security device 140 does not pass the attestation process.

Figure 7:
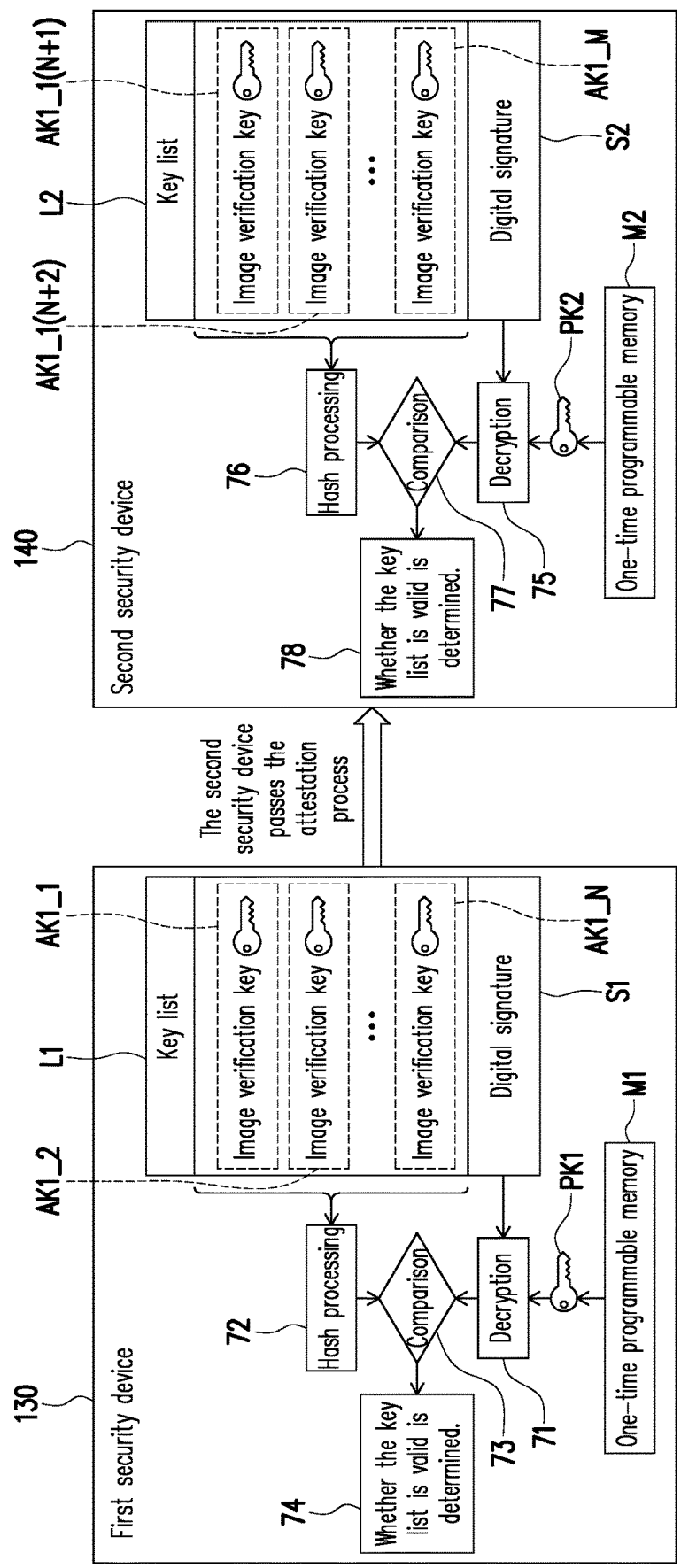
FIG. 7 is a schematic diagram of multiple security devices verifying multiple executable images according to an embodiment of the disclosure.

FIG. 7 is a schematic diagram of multiple security devices verifying executable images according to an embodiment of the disclosure. It is assumed that there are M executable images of M host devices that need to be verified. Referring to FIG. 7, the crypto engine circuit of the first security device 130 may read the public key PK1 from the one-time programmable memory M1. In operation 71, the first security device 130 may decrypt the digital signature S1 of the key list L1 using the public key PK1. The key list L1 includes N image verification keys AK1_1 to AK1_N. These image verification keys AK1_1 to AK1_N are respectively used to verify N executable images associated with N host devices, where N is less than or equal to M. For example, in the embodiment of FIG. 4, M equals 6 and N equals 4.

In operation 72, the first security device 130 may perform hash processing according to the key list L1 and obtain a hash value. In operation 73, the first security device 130 compares the hash value with the decrypted data of the digital signature S1. In operation 74, the first security device 130 determines whether the key list L1 passes the verification process according to the aforementioned comparison result. If the key list L1 passes the verification, the first security device 130 may respectively verify the integrity and validity of the N executable images by using the image verification keys AK1_1 to AK1_N.

On the other hand, if the second security device 140 passes the attestation process, the first security device 130 may enable the second security device 140 to verify the executable images. Then, the crypto engine circuit of the second security device 140 may read the public key PK2 in the one-time programmable memory M2. In operation 75, the second security device 140 may decrypt the digital signature S2 of the key list L2 using the public key PK2. The key list L2 includes (M−N) image verification keys AK1_(N+1) to AK1_M. These image verification keys AK1_(N+1) to AK1_M are respectively used to verify (M−N) executable images associated with (M−N) host devices.

In operation 76, the second security device 140 may perform hash processing according to the image verification keys AK1_(N+1) to AK1_M in the key list L2 and obtain a hash value. In operation 77, the second security device 140 compares the hash value with the decrypted data of the digital signature S2. In operation 78, the second security device 140 determines whether the key list L2 passes the verification according to the aforementioned comparison result. If the key list L2 passes the verification, the second security device 140 may respectively verify the integrity and validity of the (M−N) executable images using the image verification keys AK1_(N+1) to AK1_M.

Figure 8A:
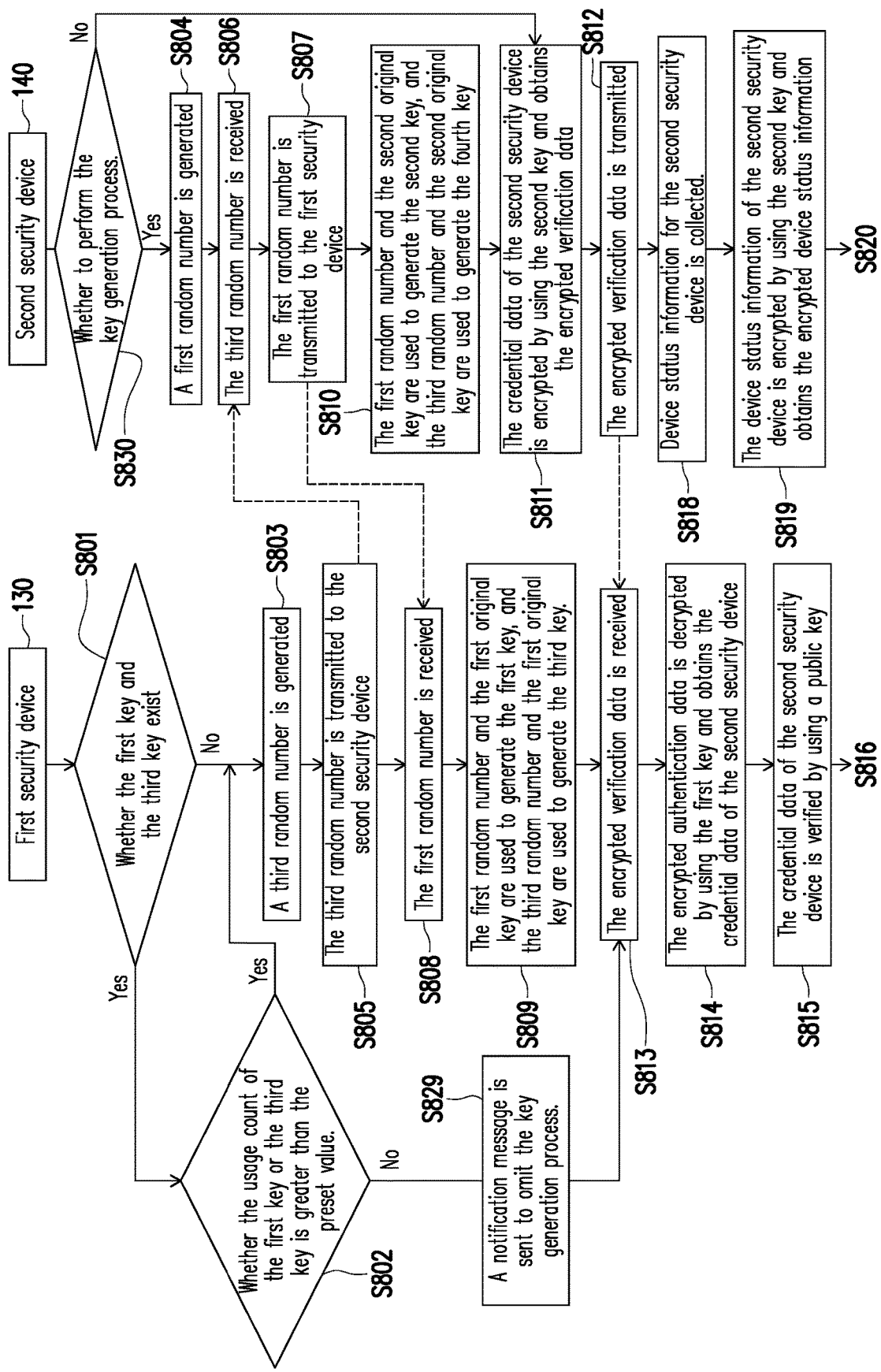
FIG. 8A and FIG. 8B are flowcharts of an attestation process according to an embodiment of the disclosure.
Figure 8B:
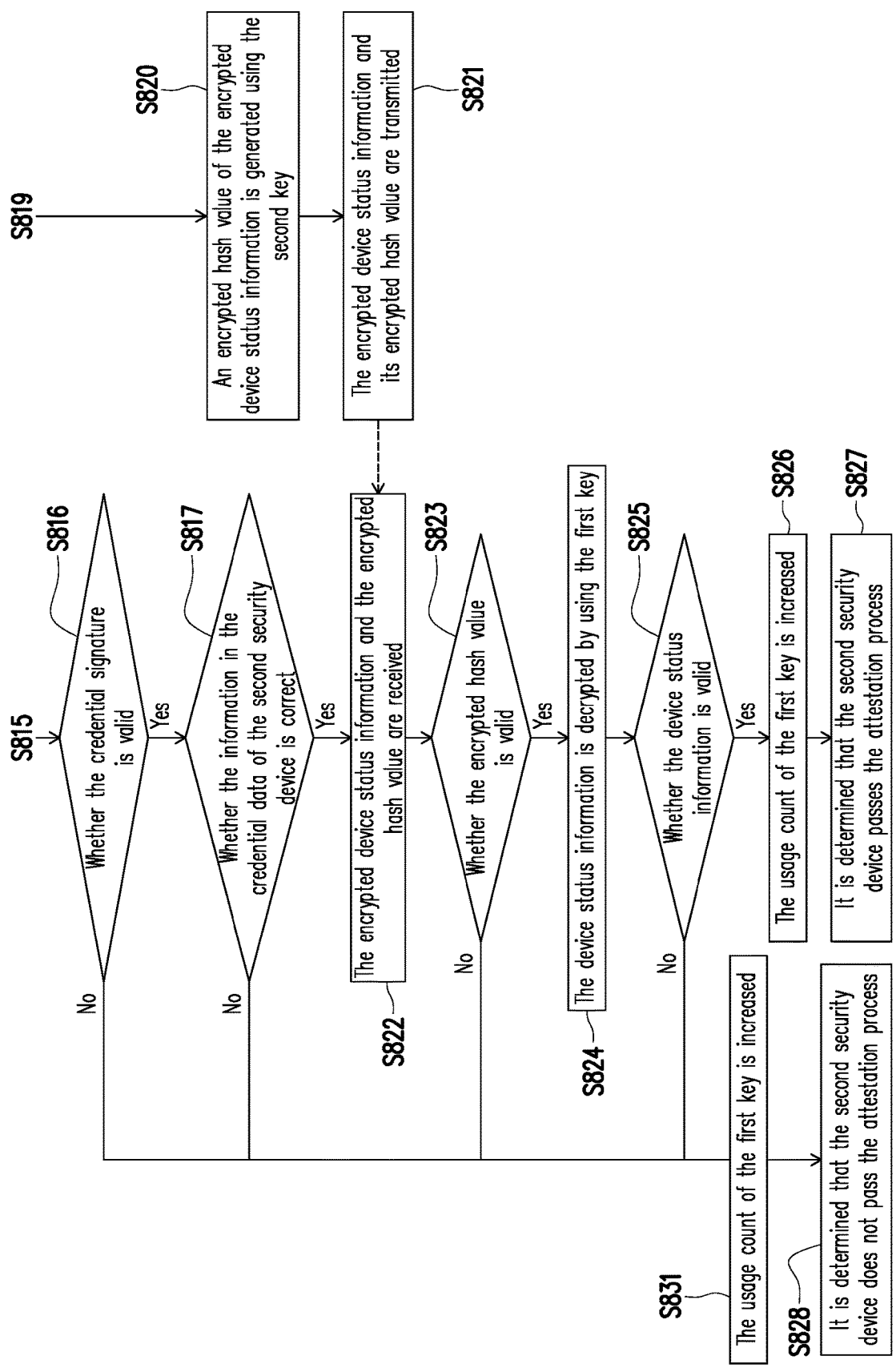

FIG. 8A and FIG. 8B are flowcharts of an attestation process according to an embodiment of the disclosure. Referring to FIG. 8A and FIG. 8B, the method of this embodiment is suitable for the aforementioned electronic system 10 or 40. In the example of FIG. 8A and FIG. 8B, the verification data including a credential data of the second security device 140 and a symmetric key being applied are taken as implemented example for illustration.

In step S801, the first security device 130 determines whether the first key and the third key exist. If the determination in step S801 is "Yes", in step S802, the first security device 130 determines whether the usage count of the first key or the third key is greater than a preset value. If the determination in step S802 is "No", in step S829, the first security device 130 sends a notification message to notify the second security device 140 to omit the execution of the key generation process, and proceeds to step S813. Correspondingly, before step S804, in step S830, the second security device 140 determines whether to execute the key generation process. If the notification message sent by the first security device 130 is not received, the second security device 140 determines to execute the key generation process (determined as Yes in step S830), and proceeds to step S804. On the contrary, if the notification message sent by the first security device 130 is received, the second security device 140 determines not to execute the key generation process (determined as No in step S830), and proceeds to step S811. If the determination in step S801 is "No" or the determination in step S802 is "Yes", in step S803, the first security device 130 generates a third random number. In step S804, the second security device 140 generates a first random number.

In step S805, the first security device 130 transmits the third random number to the second security device 140. In step S806, the second security device 140 receives the third random number. In step S807, the second security device 140 transmits the first random number to the first security device 130. In step S808, the first security device 130 receives the first random number. In step S809, the first security device 130 generates a first key using the first random number and the first original key, and generates a third key by using the third random number and the first original key. In step S810, the second security device 140 generates a second key by using the first random number and the second original key, and generates a fourth key by using the third random number and the second original key. The step S801 to step S810 are similar to the step S601 to step S610 of the foregoing embodiment, so the detailed contents thereof are not repeated herein.

Different from the foregoing embodiments, the verification data includes the credential data of the second security device 140. Therefore, in step S811, the second security device 140 encrypts the credential data of the second security device 140 by using the second key and obtains the encrypted verification data. The credential data of the second security device 140 is, for example, an X.509 credential (i.e., an SSL credential). In some embodiments, the credential data of each security device (e.g., the second security device 140) in the system may include a SoC ID, a manufacture vendor ID, a credential version, an expiration date, a key list version, the public key used for the key list, the credential version of the slave security device, and one or more keys used for the slave security device.

In step S812, the second security device 140 transmits the encrypted verification data to the first security device 130. In step S813, the first security device 130 receives the encrypted verification data. In step S814, the first security device 130 decrypts the encrypted verification data by using the first key and obtains the credential data of the second security device 140.

In step S815, the first security device 130 verifies the credential data of the second security device 140 by using a public key. In detail, the first security device 130 may decrypt and verify the digital signature of the credential of the second security device 140 by using a public key. In step S816, the first security device 130 determines whether the credential data of the second security device 140 is valid, so as to determine whether the second security device 140 passes the attestation process. Specifically, by comparing the decryption result of the digital signature of the credential of the second security device 140 and the hash value generated according to the credential content, the first security device 130 may verify whether the credential data of the second security device 140 is valid.

It should be noted that, in some embodiments, the public key used to verify the credential of the second security device 140 may be recorded in a root credential data of the first security device 130. Alternatively, in other embodiments, the public key used to verify the credential data of the second security device 140 may be recorded in the key list of the first security device 130.

Figure 9:
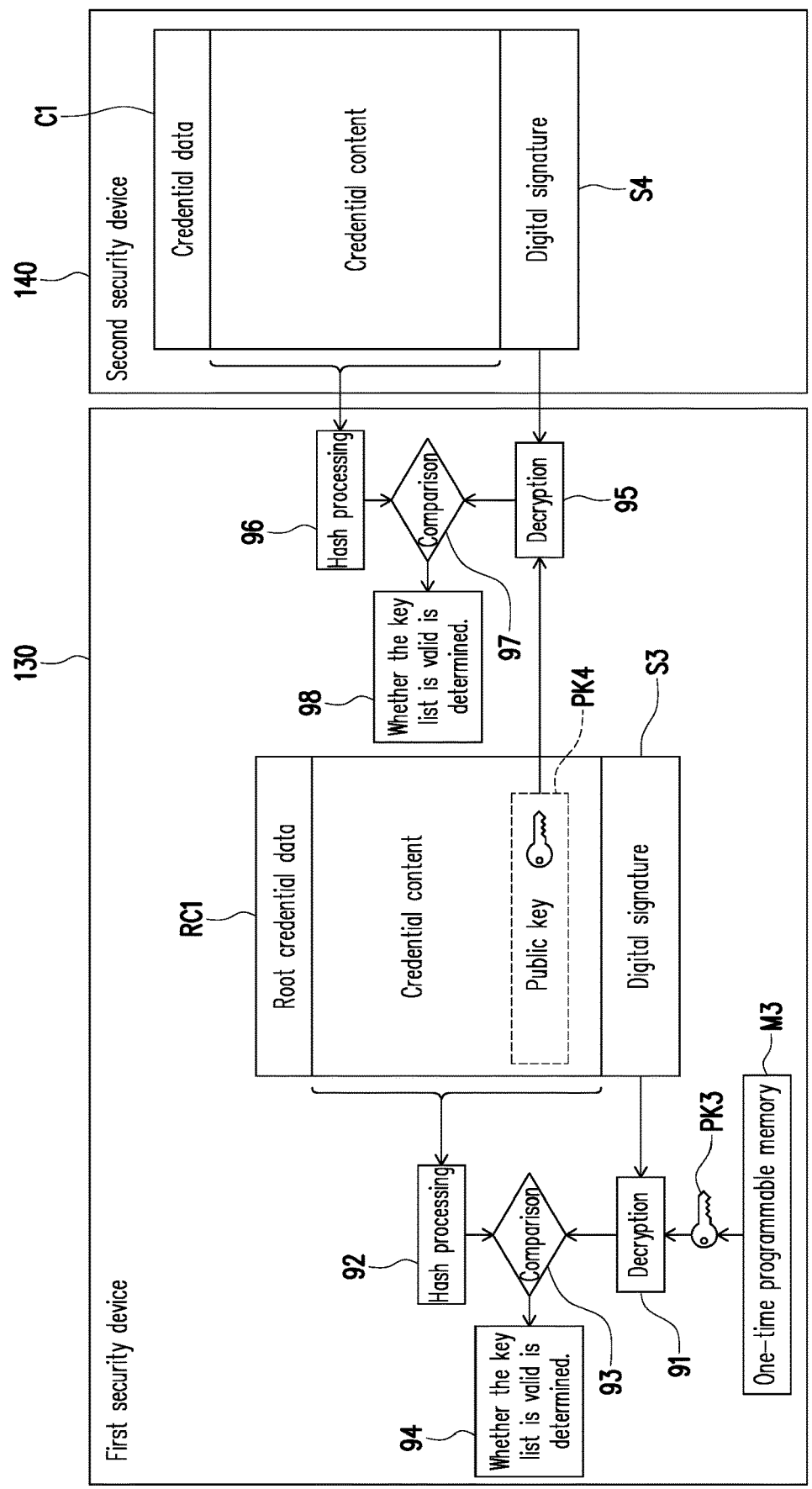
FIG. 9 is a schematic diagram of an attestation process based on credential data according to an embodiment of the disclosure.

FIG. 9 is a schematic diagram of an attestation process based on credential data according to an embodiment of the disclosure. Referring to FIG. 9, the public key PK4 used to verify the credential data C1 of the second security device 140 is recorded in the root credential data RC1 of the first security device 130. Before using the public key PK4 to verify the credential data C1 of the second security device 140, the first security device 130 needs to verify its own root credential data RC1 first. The crypto engine circuit of the first security device 130 may read the public key PK3 from the one-time programmable memory M3. In operation 91, the first security device 130 may decrypt the digital signature S3 of the root credential data RC1 by using the public key PK3.

In operation 92, the first security device 130 may perform hash processing according to the credential content of the root credential data RC1 and obtains a hash value. In operation 93, the first security device 130 compares the hash value with the decrypted data of the digital signature S3. In operation 94, the first security device 130 determines whether the root credential data RC1 is valid or invalid according to the aforementioned comparison result. The first security device 130 may obtain the public key PK4 from the root credential data RC1 after determining that the root credential data RC1 is valid. Therefore, if the root credential data RC1 is valid, in operation 95, the first security device 130 decrypts the digital signature S4 of the credential data C1 of the second security device 140 by using the public key PK4 in the root credential data RC1. In operation 96, the first security device 130 may perform hash processing according to the credential content of the credential data C1 and obtain a hash value. In operation 97, the first security device 130 compares the hash value with the decrypted data of the digital signature S4. In operation 98, the first security device 130 determines whether the credential data C1 is valid or invalid according to the aforementioned comparison result, and may continue to determine whether the information in the credential data C1 is correct.

Figure 10:
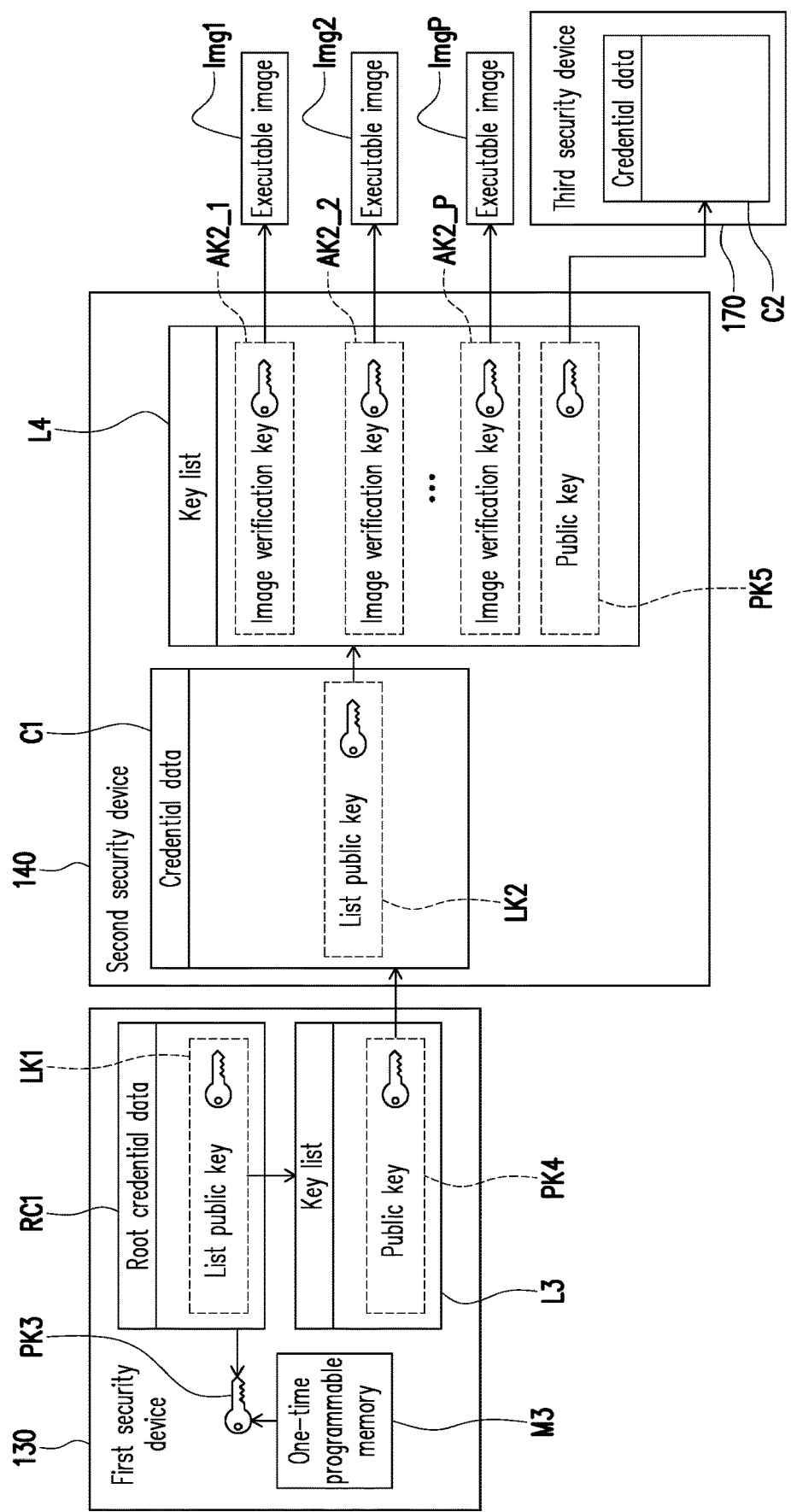
FIG. 10 is a schematic diagram of an attestation process based on credential data according to an embodiment of the disclosure.

FIG. 10 is a schematic diagram of an attestation process based on credential data according to an embodiment of the disclosure. Referring to FIG. 10, the public key PK4 used to verify the credential data of the second security device 140 is recorded in the key list L3 of the first security device 130. The first security device 130 may verify the root credential data RC1 using the public key PK3 in the one-time programmable memory M3. The verification process of the root credential data RC1 is similar to the example shown in FIG. 9, and details are not repeated herein. The first security device 130 may obtain the list public key LK1 of the key list L3 from the root credential data RC1 after determining that the root credential data RC1 is valid, and verify the key list L3 by using the list public key LK1 and obtain the key list L3. It should be noted that the key list L3 may further include an image verification key (not shown) used to verify the executable images of the first host device 110. Then, the first security device 130 may obtain the public key PK4 from the key list L3, and verify the credential data C1 of the second security device 140 by using the public key PK4. The verification process of the credential data C1 is similar to the example shown in FIG. 9, and details are not repeated herein.

In addition, as shown in FIG. 10, if the second device 140 passes the attestation process, the second security device 140 may obtain the list public key LK2 from the credential data C1, and verify the key list L4 by using the list public key LK2 and obtain the key list L4. The key list L4 includes P image verification keys AK2_1 to AK2_P used to verify P executable images Img1 to ImgP. For example, the image verification key AK2_1 may be used to verify the executable image Img1, the image verification key AK2_2 may be used to verify the executable image Img2, and the image verification key AK2_P may be used to verify the executable image ImgP. In addition, the key list L4 may also include the public key PK5 used to verify the credential data C2 of the third security device 170.

Returning to FIG. 8, if the determination in step S816 is "Yes", in step S817, the first security device 130 determines whether the information in the credential data of the second security device 140 is correct. For example, the first security device 130 may determine whether the SoC ID or the manufacture vendor ID in the credential data of the second security device 140 is correct. If the credential of the second security device 140 is valid and the information in the credential data is correct, the first security device 130 determines that the decrypted verification data is valid. If the credential of the second security device is invalid or the information in the credential data is incorrect, the first security device 130 determines that the decrypted verification data is invalid.

On the other hand, in step S818, the second security device 140 collects the device status information of the second security device 140. In step S819, the second security device 140 encrypts the device status information of the second security device 140 by using the second key and obtains the encrypted device status information. It should be noted that, in step S820, the second security device 140 generates an encrypted hash value of the encrypted device status information. For example, the second security device 140 may generate the encrypted hash value by using the second key and the encrypted device status information according to a hash-based MAC (HMAC) algorithm. In step S821, the second security device 140 transmits the encrypted device status information and its encrypted hash value to the first security device 130.

If the determinations in step S816 and step S817 are "Yes", then step S822 is continued, and the first security device 130 receives the encrypted device status information and its encrypted hash value. In step S823, the first security device 130 determines whether the encrypted hash value of the encrypted device status information is valid. In detail, since the encrypted hash value is generated according to the second key, the first security device 130 verifies whether the encrypted hash value is valid by using the corresponding first key.

If the determination in step S823 is "Yes", in step S824, the first security device 130 decrypts the encrypted device status information by using the first key. In step S825, the first security device 130 determines whether the device status information is valid. If the determination in step S825 is "Yes", in step S826, the first security device 130 increases the usage count of the first key. In step S827, the first security device 130 determines that the second security device passes the attestation process. If the determination in step S816, step S817, step S823, or step S825 is "No", in step S831, the first security device 130 increases the usage count of the first key. Next, in step S828, the first security device 130 determines that the second security device 140 does not pass the attestation process.

Figure 11:
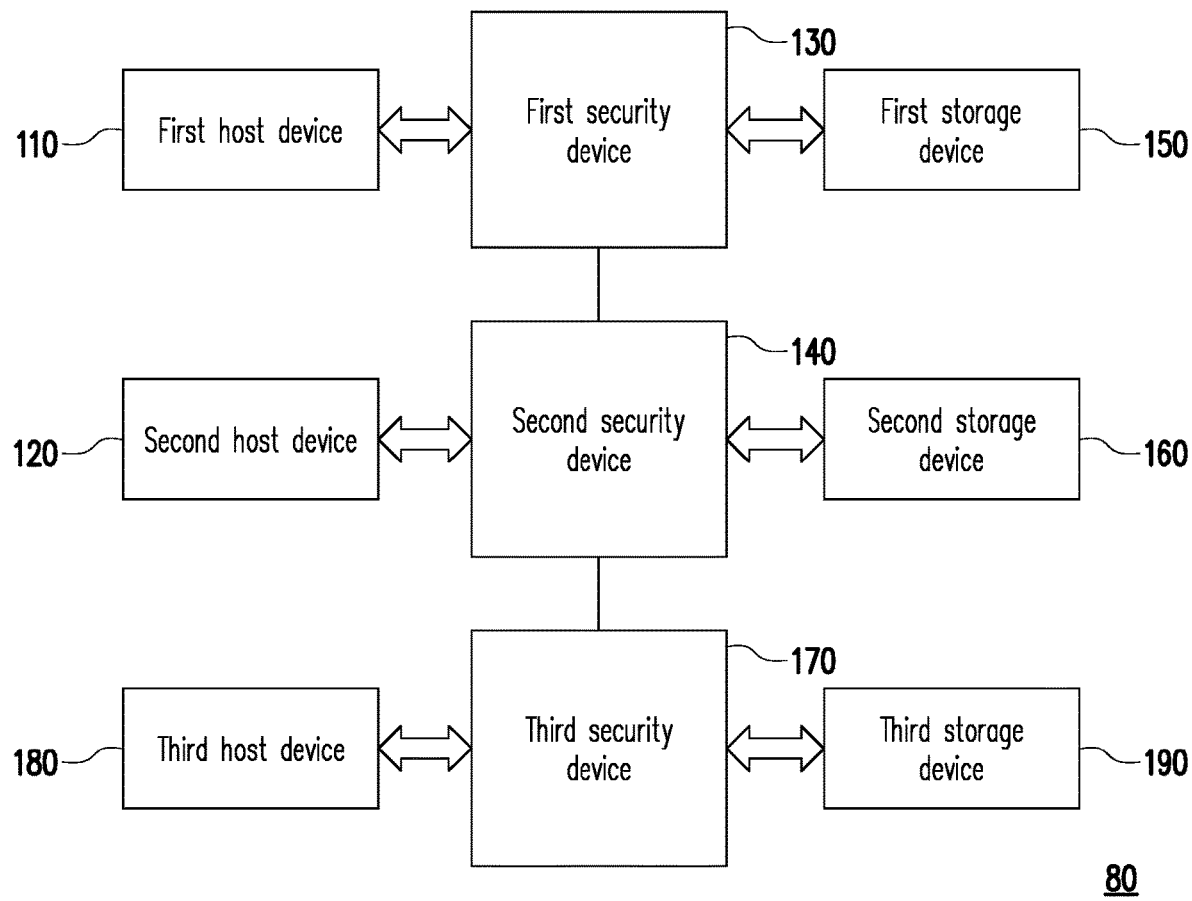
FIG. 11 is a block diagram of an electronic system according to an embodiment of the disclosure.

Most of the aforementioned embodiments are described by taking two security devices as examples, but the disclosure is not limited thereto. In some embodiments, the electronic system may include more than two security devices. FIG. 11 is a block diagram of an electronic system according to an embodiment of the disclosure. Referring to FIG. 11, in addition to the first host device 110, the second host device 120, the first security device 130, the second security device 140, the first storage device 150, and the second storage device 160, the electronic system 80 may further include a third host device 180, a third storage device 190, and a third security device 170. The third security device 170 is connected to the third host device 180, the third storage device 190, and the second security device 140.

The first security device 130 serving as the trusted root may first perform the attestation process on the second security device 140 as described in the foregoing embodiments. If the second security device 140 passes the attestation process, before verifying the executable images of the second host device 120, the second security device 140 also performs the attestation process on the third security device 170. In other words, the second security device 140 serves as a slave security device of the first security device 130 and simultaneously serves as a master security device of the third security device 170. The operation of the second security device 140 performing the attestation process on the third security device 170 is similar to the operation as the first security device 130 performs the attestation process on the second security device 140.

If the third security device 170 passes the attestation process, the second security device 140 enables the third security device 170 to verify the executable images of the third host device 180. If the third security device 170 does not pass the attestation process, the second security device 140 disables a function of the third security device 170, and the function includes verifying the executable image of the third host device 180. That is, the second security device 140 may determine whether to delegate the authority of performing the platform firmware resiliency operation to the third security device 170. In addition, in some embodiments using credential data for the attestation process, the public key used to verify the credential data of the third security device 170 may be recorded in the credential data or the key list of the second security device 140 to reduce the amount of one-time programmable memory used to record the public key during the lifetime of the device. In addition, the use of credential data or key list may also achieve the effect of key delegation mechanism and improve the efficiency of key management in the organization.

Figure 12A:
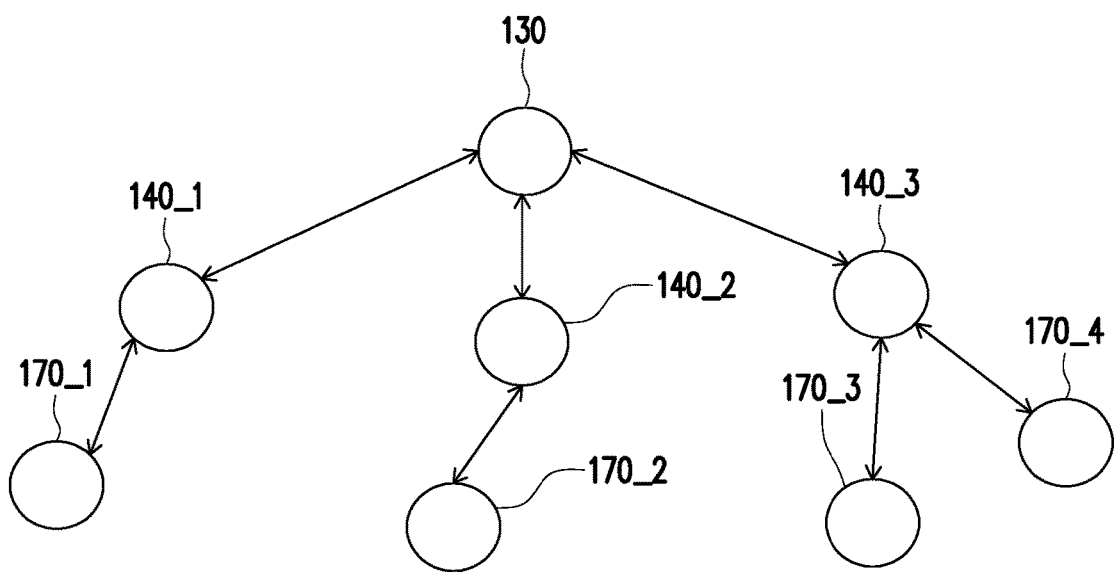
FIG. 12A and FIG. 12B are schematic diagrams of the device topology of a multi-security device according to an embodiment of the disclosure.
Figure 12B:
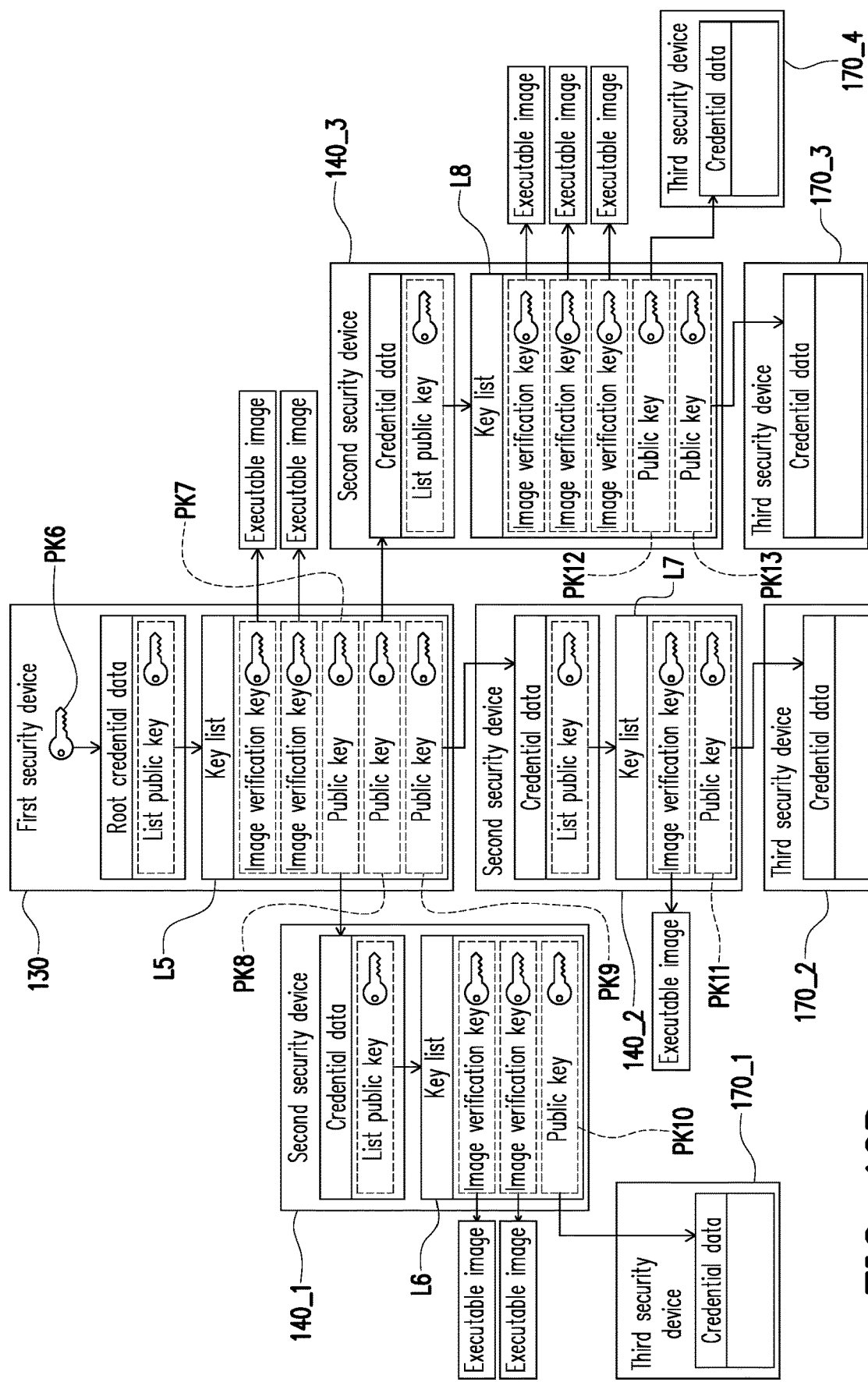

In addition, it should be noted that the number of security devices and the topology of the devices formed may be disposed according to actual requirements. For example, FIG. 12A and FIG. 12B are schematic diagrams of the device topology of multi-security devices according to an embodiment of the disclosure. Referring to FIG. 12A and FIG. 12B, the first security device 130 serving as the trusted root and located at the first level may be connected to three second security devices 140_1 to 140_3, and performs the attestation process on the second security devices 140_1 to 140_3 at the second level. In addition, the second security device 140_1 may be connected to the third security device 170_1, and performs an attestation process on the third security device 170_1 at the third level. The second security device 140_2 may be connected to the third security device 170_2, and performs an attestation process on the third security device 170_2 at the third level. The second security device 140_3 may be connected to two third security devices 170_3 to 170_4, and performs an attestation process on the third security devices 170_3 to 170_4 at the third level.

In the device topology of FIG. 12A and FIG. 12B, the first security device 130 serving as the trusted root has the highest security priority level. In addition, the i-th level security device with a higher security priority level may be used to verify and control the j-th level security device with a lower security priority level, where i<j, and i and j are integers greater than 0. In some embodiments, after the j-th level security device with a lower security priority level passes the attestation process, the i-th level security device with a higher security priority level may provide the public key or public data to the j-th level security device with a lower security priority level. In addition, in some embodiments, the j-th level security device with a lower security priority level may report a security report message or an interrupt event to the i-th level security device with a higher security priority level.

It should be noted that, in addition to the image verification key used to verify the executable image, the key list of the security device may also include one or more public keys used to verify the credential data of the slave security devices. Referring to FIG. 12B, the credential data of the first security device 130 serving as the trusted root may be called root credential data. The first security device 130 needs to use the public key PK6 in the one-time programmable memory to verify the root credential data and obtain the key list L5. The key list L5 includes two image verification keys and three public keys PK7 to PK9. The three public keys PK7 to PK9 in the key list L5 are respectively used to verify the credential data of the three second security devices 140_1 to 140_3.

The key list L6 of the second security device 140_1 includes the public key PK10 used to verify the credential data of the third security device 170_1. Similarly, the key list L7 of the second security device 140_2 includes the public key PK11 used to verify the credential data of the third security device 170_2. The key list L8 of the second security device 140_3 includes the public keys PK12 and PK13 used to verify the credential data of the third security devices 170_3 and 170_4 respectively. The operations using the public key to verify the credential data and obtain the key list have been clearly described in the foregoing embodiments, and are not repeated herein. Based on all the foregoing descriptions, one of ordinary skill in the art to which the disclosure pertains may deduce how the master security device performs the attestation process on its slave security devices.

To sum up, in the embodiment of the disclosure, by disposing multiple security devices and performing the attestation process, multiple trusted security devices may be used to perform the verification of executable images and other firmware security maintenance tasks. Based on this, platform security may be ensured and executable images are not maliciously tampered with, and the problem of limited resources of existing secured SoCs may be solved. In addition, since the device topology of multiple security devices may be designed based on actual requirements, not only is it not needed to redesign the secured SoC, but also greatly improves application flexibility. In addition, since the multiple security devices may perform verification of multiple executable images synchronously, the time for the secured SoC to operate in the PFR T-1 stage may be reduced, thereby improving the system boot performance.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An electronic system, comprising:
   a first host device;
   a second host device;
   a first security device, connected to the first host device; and
   a second security device, connected to the second host device and the first security device, wherein the first security device and the second security device are secure chips,
   wherein the first security device performs an attestation process on the second security device,
   the first security device enables the second security device to verify an executable image of the second host device if the second security device passes the attestation process, wherein
   the first security device delegates authority to the second security device to verify the executable image of the second host device,
   the first security device disables the second security device from verifying the executable image of the second host device if the second security device does not pass the attestation process.

2. The electronic system according to claim 1, further comprising:
   a first storage device, connected to the first security device and stores the executable image of the first host device, wherein the first security device verifies the executable image of the first host device; and
   a second storage device, connected to the second security device and stores the executable image of the second host device.

3. The electronic system according to claim 1, wherein the attestation process comprises:
   the first security device or the second security device generating a first random number;
   the first security device generating a first key according to a first original key and the first random number, and the second security device generating a second key according to a second original key and the first random number;
   the second security device encrypting verification data by using the second key and generating encrypted verification data, and transmitting the encrypted verification data to the first security device;
   the first security device decrypting the encrypted verification data by using the first key and obtaining decrypted verification data; and
   the first security device determining whether the second security device passes the attestation process according to the decrypted verification data.

4. The electronic system according to claim 3, wherein the attestation process comprises:
   the first security device determining that the second security device does not pass the attestation process if the decrypted verification data is invalid;
   the first security device determining whether device status information of the second security device is valid if the decrypted verification data is valid;
   the first security device determining that the second security device does not pass the attestation process if the device status information of the second security device is invalid; and
   the first security device determining that the second security device passes the attestation process if the device status information of the second security device is valid.

5. The electronic system according to claim 4, wherein the attestation process comprises:
   the second security device encrypting the device status information of the second security device by using the second key and generating encrypted device status information;
   the second security device transmitting the encrypted device status information to the first security device; and
   the first security device decrypting the encrypted device status information by using the first key and obtaining the device status information of the second security device.

6. The electronic system according to claim 3, wherein the verification data comprises a second random number generated by the first security device, the first security device transmits the second random number to the second security device, and the first security device determines whether the decrypted verification data is the same as the second random number, to determine whether the second security device passes the attestation process.

7. The electronic system according to claim 3, wherein the verification data comprises credential data of the second security device, and the first security device determines whether the credential data of the second security device is valid by using a public key, to determine whether the second security device passes the attestation process.

8. The electronic system according to claim 7, wherein the public key is recorded in a root credential data of the first security device, and the first security device obtains the public key from the root credential data after determining that the root credential data is valid.

9. The electronic system according to claim 7, wherein the public key is recorded in a key list of the first security device, the first security device obtains a list public key of the key list after determining that the root credential data is valid, and obtains the key list by using the list public key, the key list further comprises an image verification key used to verify the executable image of the first host device.

10. The electronic system according to claim 3, wherein the attestation process further comprises:
the first security device determining whether a usage count of the first key is greater than a preset value; and
the first security device generating the first random number if the usage count of the first key is greater than the preset value.

11. The electronic system according to claim 1, wherein the first security device regularly or irregularly performs the attestation process on the second security device.

12. The electronic system according to claim 1, wherein in response to the electronic system being powered on, the first security device performs an attestation process on the second security device.

13. The electronic system according to claim 1, further comprising:
a third host device; and
a third security device, connected to the third host device and the second security device,
the second security device performing the attestation process on the third security device if the second security device passes the attestation process,
the second security device enabling the third security device to verify an executable image of the third host device if the third security device passes the attestation process.

14. A security authority delegation method, suitable for and electronic system comprising a first host, a second host, a first security device, and a second security device, the method comprising:
performing an attestation process on the second security device by the first security device, wherein the first security device is connected to the first host device, the second security device is connected to the second host device and the first security device, and the first security device and the second security device are secure chips;
enabling the second security device by the first security device to verify an executable image of the second host device if the second security device passes the attestation process, wherein the first security device delegates authority to the second security device to verify the executable image of the second host device; and
disabling the second security device by the first security device from verifying the executable image of the second host device if the second security device does not pass the attestation process.

15. The security authority delegation method according to claim 14, wherein performing the attestation process on the second security device by the first security device comprises:
generating a first random number by the first security device or the second security device;
generating a first key by the first security device according to a first original key and the first random number, and
generating a second key by the second security device according to a second original key and the first random number;
encrypting verification data by the second security device by using the second key and generating encrypted verification data, and transmitting the encrypted verification data to the first security device;
decrypting the encrypted verification data by the first security device by using the first key and obtaining decrypted verification data; and
determining whether the second security device passes the attestation process by the first security device according to the decrypted verification data.

16. The security authority delegation method according to claim 15, wherein determining whether the second security device passes the attestation process by the first security device according to the decrypted verification data comprises:
determining that the second security device does not pass the attestation process by the first security device if the decrypted verification data is invalid;
determining whether device status information of the second security device is valid by the first security device if the decrypted verification data is valid;
determining that the second security device does not pass the attestation process by the first security device if the device status information of the second security device is invalid; and
determining that the second security device passes the attestation process by the first security device if the device status information of the second security device is valid.

17. The security authority delegation method according to claim 15, wherein the verification data comprises a second random number generated by the first security device,
wherein determining whether the second security device passes the attestation process by the first security device according to the decrypted verification data comprises:
transmitting the second random number to the second security device by the first security device; and
determining whether the decrypted verification data is the same as the second random number by the first security device, to determine whether the second security device passes the attestation process.

18. The security authority delegation method according to claim 15, wherein the verification data comprises credential data of the second security device,
wherein determining whether the second security device passes the attestation process by the first security device according to the decrypted verification data comprises:
determining whether the credential data of the second security device is valid by the first security device by using a public key, and determining whether the second security device passes the attestation process.

19. The security authority delegation method according to claim 18, wherein the public key is recorded in a root credential data of the first security device, wherein determining whether the credential data of the second security device is valid by the first security device by using the public key comprises:
obtaining the public key from the root credential data by the first security device after determining that the root credential data is valid.

20. The security authority delegation method according to claim 18, wherein the public key is recorded in a key list of the first security device, the key list further comprises an image verification key used to verify the executable image of the first host device, wherein determining whether the credential data of the second security device is valid by the first security device by using the public key comprises:

obtaining a list public key of the key list by the first security device after determining that the root credential data is valid, and verifying and obtaining the key list by using the list public key.

* * * * *